United States Patent [19]

Ohmae et al.

[11] Patent Number: 5,385,974
[45] Date of Patent: Jan. 31, 1995

[54] GRAFT COPOLYMER, PROCESS FOR PRODUCTION THEREOF, AND PLASTICIZER COMPRISING SAID COPOLYMER AS ACTIVE COMPONENT

[75] Inventors: Tadayuki Ohmae, Chiba; Hisao Tanaka, Ichihara; Sumio Hara, Sodegaura, all of Japan

[73] Assignee: Sumitomo Chemical Company, Limited, Osaka, Japan

[21] Appl. No.: 91,564

[22] Filed: Jul. 15, 1993

[30] Foreign Application Priority Data

Jul. 21, 1992 [JP] Japan .................... 4-193837

[51] Int. Cl.$^6$ ............................................. C08L 29/04
[52] U.S. Cl. ........................................ 525/58; 525/59; 525/286; 525/302
[58] Field of Search ................... 525/58, 59, 286, 302

[56] References Cited

U.S. PATENT DOCUMENTS

| | | | |
|---|---|---|---|
| 2,434,179 | 1/1948 | Sharkey | 260/90 |
| 2,941,988 | 6/1960 | Wolf | 260/91.3 |
| 3,106,543 | 10/1963 | Milne | 260/45.5 |
| 3,738,975 | 6/1973 | Bristol | 260/91.3 |
| 3,800,006 | 3/1974 | Katayama et al. | 525/386 |
| 4,104,453 | 8/1978 | Broering et al. | 526/10 |

FOREIGN PATENT DOCUMENTS

| | | |
|---|---|---|
| 1239634 | 7/1960 | France . |
| 63-110216 | 5/1988 | Japan . |
| 141650 | 9/1989 | Japan . |
| 3-227307 | 10/1991 | Japan . |
| 2095262 | 9/1982 | United Kingdom . |

OTHER PUBLICATIONS

R. Endo et al., "Solution Behavior of [(Ethylene–co–Vinyl Alcohol)–g–Ethylene Oxide] Graft Copolymers", Journal of Polymer Science: Polymer Physics Edition, vol. 17, Jan. 197, pp. 645–654.

"Kokbunshi Ronbunshu", vol. 36, No. 7, Jan. 1979, pp. 489–494 with English–Language Abstract. No translation for full document.

G. A. Estina et al., "Non–Catalysed Oligomerziation of $\epsilon$-Caprolactone in the Presence of Diols", Polymer Science U.S.S.R. vol. 31, No. 4, Jan. 1989, pp. 920–926.

*Primary Examiner*—W. Robinson N. Clark
*Attorney, Agent, or Firm*—Sughrue, Mion, Zinn, Macpeak & Seas

[57] ABSTRACT

A novel graft copolymer having a number-average molecular weight of about 1,500 to about 1,000,000, produced by graft-copolymerizing an alkylene oxide and a cyclic ester to a saponified ethylene-saturated carboxylic acid vinyl ester copolymer; a process for production thereof; and a plasticizer comprising said graft copolymer as the active component.

12 Claims, 1 Drawing Sheet

GRAFT COPOLYMER, PROCESS FOR PRODUCTION THEREOF, AND PLASTICIZER COMPRISING SAID COPOLYMER AS ACTIVE COMPONENT

BACKGROUND OF THE INVENTION

1. Field of the Invention

The present invention relates to a novel graft copolymer, a process for production thereof, and a plasticizer comprising said copolymer as the active component. More particularly, the present invention relates to a novel graft copolymer produced by graft-copolymerizing an alkylene oxide and a cyclic ester to a saponified ethylene-saturated carboxylic acid vinyl ester copolymer, a process for production thereof, and a plasticizer comprising said copolymer as the active component.

2. Description of the Prior Art

Many of synthetic resins and synthetic fibers are generally either hydrophobic or hydrophilic because of their molecular structures, and their applications have been developed by utilizing their properties.

Meanwhile, in recent years, the requirements for resins, etc. have been diversified and, in an increasing number of the application fields, resins, etc. alone have become unable to satisfy the requirements. Further, development of new materials has become necessary. In order to respond to the new situations, various measures have been taken.

These measures include, for example, (1) use of a compatibility improver in production of a resin of new properties (e.g. a polymer alloy) by mixing a plurality of resins, (2) use of an antistatic agent for suppressing the surface electrification of a resin and (3) use of a plasticizer of low evaporativity.

Saponified ethylene-saturated carboxylic acid vinyl ester copolymers, for example, a saponified ethylene-vinyl acetate copolymer are in practical use as an oxygen barrier resin, an adhesive for glass, an adhesive for padding cloth of fiber product, etc. by controlling the ethylene content, saponification degree, etc.

Also, graft copolymers produced by graft-copolymerizing an alkylene oxide to a saponified ethylene-saturated carboxylic acid vinyl ester copolymer are described in "KOBUNSHI RONBUNSYU" Vol. 36, No. 7, p. 489 (1979) and also in Japanese Patent Application Kokai (Laid-Open) No. 227307/1991. For example, a saponified product (hereinafter referred to as EVOH) of an ethylene-vinyl acetate copolymer (hereinafter referred to as EVA) has nearly satisfactory compatibility with a polyolefin because it is a polymer and its main chain is composed mainly of a polymethylene structure.

A graft copolymer produced by graft-copolymerizing said EVOH with an alkylene oxide, for example, ethylene oxide has a property similar to that of ethylene glycol and is a highly hydrophilic resin.

EVOH, however, is not yet sufficient in compatibility with resins, has low plasticity, and is soluble in water when dipped therein, although it has a good antistatic property. Thus, EVOH is not fully satisfactory.

SUMMARY OF THE INVENTION

In view of the above situation, the present inventors made a study to improve the properties of saponified ethylene-saturated carboxylic acid vinyl ester copolymer. As a result, the present inventors found that a graft copolymer obtained by graft-copolymerizing an alkylene oxide and a cyclic ester to said copolymer is useful for modification of resins. The above finding and further study have led to the completion of the present invention.

The present invention provides a graft copolymer having a number-average molecular weight of about 1,500 to about 1,000,000, produced by graft-copolymerizing an alkylene oxide and a cyclic ester to a saponified ethylene-saturated carboxylic acid vinyl ester copolymer.

The present invention further provides a process for producing a graft copolymer, which comprises reacting an alkylene oxide and a cyclic ester with a saponified ethylene-saturated carboxylic acid vinyl ester copolymer in the presence of an anionic catalyst or a cationic catalyst.

The present invention furthermore provides a plasticizer comprising, as the active component, a graft copolymer having a number-average molecular weight of about 1,500 to about 1,000,000, produced by graft-copolymerizing an alkylene oxide and a cyclic ester to a saponified ethylene-saturated carboxylic acid vinyl ester copolymer.

DESCRIPTION OF THE DRAWING

In FIG. 1, 1 represents a gel permeation chromatogram of EVOH; 2 represents a gel permeation chromatogram of E-g-EO; and 3 represents a gel permeation chromatogram of E-g-EO-Cl.

DETAILED DESCRIPTION OF THE INVENTION

Figure 1:
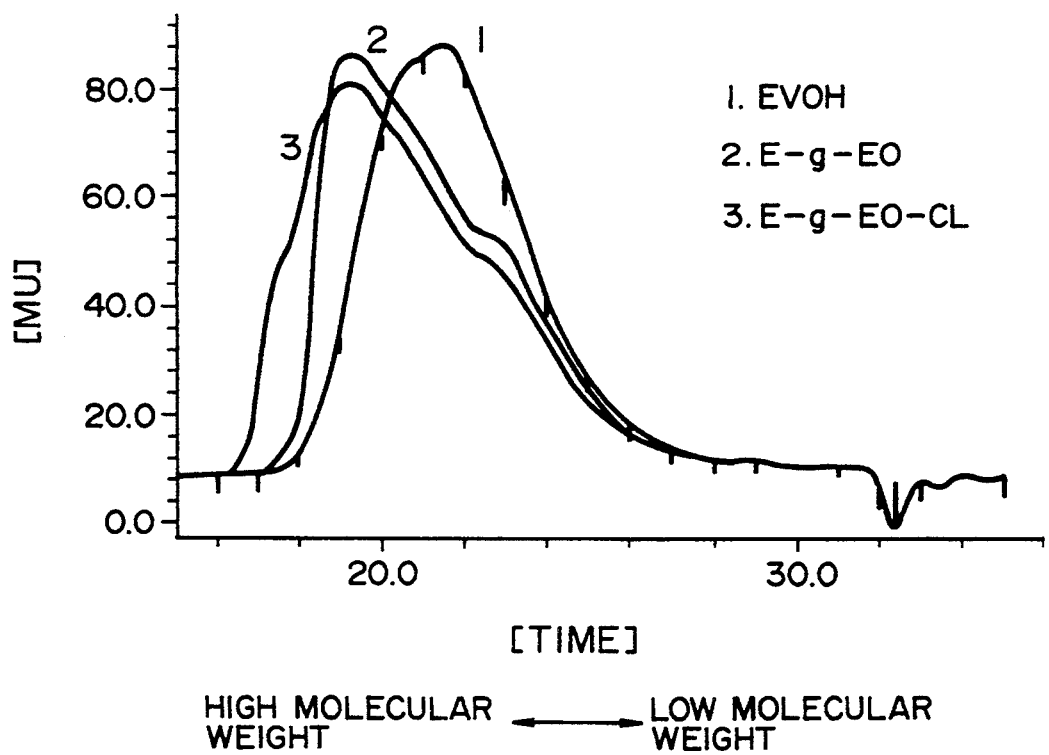
FIG. 1 shows gel permeation chromatograms of the raw material (EVOH), intermediate product (E-g-EO) and final product (E-g-EO-CL) used and obtained in Example 1.

The present invention is hereinafter described in detail.

The graft copolymer produced by the present process comprises, as the active component, a high-molecular component composed mainly of a polymethylene structure derived from a saponified ethylene-saturated carboxylic acid vinyl ester copolymer and, as the side chains, a low-molecular to high-molecular component composed mainly of an alkylene oxide and a ring-opening structure of a cyclic ester.

The main chain, i.e. the high-molecular component composed mainly of a polymethylene structure derived from a saponified ethylene-saturated carboxylic acid vinyl ester copolymer, can be obtained by a saponification reaction of an ethylene-saturated carboxylic acid vinyl ester copolymer. The ethylene-saturated carboxylic acid vinyl ester copolymer has no particular restriction.

The saponified ethylene-saturated carboxylic acid vinyl ester copolymer includes, for example, a saponified ethylene-vinyl acetate copolymer, a saponified ethylene-vinyl propionate copolymer and a saponified ethylene-vinyl butyrate copolymer. Of these, preferable is a saponified ethylene-vinyl acetate copolymer. More preferable is a saponified ethylene-vinyl acetate copolymer having an ethylene unit content of 1–90% by weight, a number-average molecular weight of 1,000–20,000 and a saponification degree of 30–100%.

The side chains, i.e. the low-molecular to high-molecular component composed mainly of an alkylene oxide and a ring-opening structure of a cyclic ester can be formed by, for example, grafting an alkylene oxide and a cyclic ester to a saponified ethylene-saturated carboxylic acid vinyl ester copolymer in the presence of an anionic or cationic catalyst.

The alkylene oxide used in the present invention includes, for example, ethylene oxide, propylene oxide, isobutylene oxide, 1-butene oxide, 2-butene oxide, α-olefin oxide, trimethylethylene oxide and tetramethylethylene oxide. These alkylene oxides may be used alone or as an admixture thereof. Of them, ethylene oxide and propylene oxide are preferable.

The cyclic ester used in the present invention includes lactones such as ε-caprolactone, γ-butyrolactone, δ-valerolactone, β-propiolactone, γ-valerolactone, methyl-ε-caprolactone, dimethyl-ε-caprolactone, trimethyl-ε-caprolactone and the like. These lactones may be used alone or as an admixture thereof. Of them, ε-caprolactone is preferable.

The amounts of the alkylene oxide and cyclic ester to be grafted have no particular restrictions, but are each 5-1,000 parts by weight, preferably 50-500 parts by weight per 100 parts by weight of the saponified ethylene-saturated carboxylic acid vinyl ester copolymer.

The process of the present invention has no particular restriction with respect to the temperature, pressure, time, etc. but is preferably carried out, for example, at 20°-300° C. at 1-10 atm. for 5-300 minutes.

The reactor has no particular restriction, either. There may be used, for example, a normal pressure reactor or a pressure reactor each of tank or tube shape.

The amount of the alkylene oxide used in the present invention is 5-1,000 parts by weight, preferably 50-500 parts by weight per 100 parts by weight of the saponified ethylene-saturated carboxylic acid vinyl ester copolymer.

The amount of the cyclic ester used in the present invention is 5-1,000 parts by weight, preferably 50-500 parts by weight per 100 parts by weight of the saponified ethylene-saturated carboxylic acid vinyl ester copolymer.

In the process of the present invention, use of an anionic catalyst or cationic catalyst is effective. The anionic catalyst includes alkali metal hydroxides such as potassium hydroxide, sodium hydroxide, lithium hydroxide and the like; and the alkali metal alkoxides such as sodium methoxide, sodium ethoxide, potassium methoxide, potassium ethoxide, lithium ethoxide and the like. The cationic catalyst includes organotitanium compounds such as titanium tetraisopropoxide, titanium tetrabutoxide, titanium tetraethoxide and the like; tin compounds such as tetraoctyltin, diphenyltin dilaurate, dilauryltin oxide, dibutyltin oxide, tin octylate, dibutyltin laurate, stannous chloride, stannous bromide, stannous iodide and the like; and lead compounds such as lead salicylate, lead 2-ethyl-hexanoate, lead acetate and the like.

The amount of the catalyst used has no particular restriction but is ordinarily 0.005-10% by weight, preferably 0.01-2% by weight based on the amount of the alkylene oxide or cyclic ester. When the catalyst amount is too small, a long reaction time is required or there takes place an insufficient reaction. When the catalyst amount is too many, the resulting graft copolymer may be colored and, moreover, such an amount is uneconomical.

In the process of the present invention, a polymerization solvent may be used as necessary. The solvent which may be used, is a solvent free from any active hydrogen (e.g. active hydrogen of hydroxyl group, carboxyl group or amino group). Such a solvent includes hydrocarbons such as benzene, toluene, xylene, heptane, cyclohexane and the like; esters such as ethyl acetate, butyl acetate and the like; ketones such as methyl ethyl ketone, methyl isobutyl ketone and the like: and ethers such as ethylene glycol dimethyl ether, diethylene glycol dimethyl ether and the like. The amount of the solvent used may be appropriately selected in view of the reaction temperature and the reaction system viscosity.

In the present process, an alkylene oxide and a cyclic ester are grafted to a saponified ethylene-saturated carboxylic acid vinyl ester copolymer in the presence of an anionic catalyst or cationic catalyst using, as necessary, a solvent, whereby a graft copolymer of the present invention can be obtained. At that time, the alkylene oxide and the cyclic ester may be added in any order or simultaneously.

The graft copolymer obtained in the present process has no particular restriction with respect to the molecular weight. However, a number-average molecular weight of about 1,500 to about 1,000,000 is useful industrially.

The graft copolymer of the present invention is useful as a plasticizer capable of imparting plasticity to plastics and rubbers and can be compounded in a polyvinyl chloride, a polyvinylidene chloride, a polyolefin, synthetic rubbers, etc. as a plasticizer which has low evaporativity and which can retain its plasticity for a long period of time.

In using the graft copolymer obtained by the present process, as a plasticizer, there is no particular restriction, and the graft copolymer can be kneaded into a plastic or a rubber in an amount necessary for imparting required plasticity thereto, for example, in an amount of 5-300 parts by weight, preferably 20-100 parts by weight per 100 parts by weight of a polyvinyl chloride. At that time, the graft copolymer as a plasticizer may be used in combination with other plasticizer, or together with various stabilizers (e.g. antioxidant, heat stabilizer, photostabilizer), a lubricant, an antistatic agent, a pigment, a reinforcing agent, an extender, etc.

As described above in detail, the graft copolymer of the present invention is a novel copolymer and can be widely used for modification of resins, etc. as a plasticizer, a compatibility improver, an antistatic agent, etc. Further, the graft copolymer of the present invention can be produced under mild conditions and at a high yield.

DESCRIPTION OF PREFERRED EMBODIMENTS

The present invention is hereinafter described specifically by way of Examples. However, the present invention is by no means restricted to the Examples.

Example 1

In a 1-liter autoclave were placed 1 g of potassium hydroxide and 100 g of a 90%-saponified product (EVOH) of an ethylene-vinyl acetate copolymer (EVA) having an ethylene content of 31% and a number-average molecular weight of 1,900. The mixture was heated to 170° C. Thereinto was introduced, in two hours, 100 g of ethylene oxide (EO) with the system being kept at 2 atm. to conduct a graft copolymerization. The unreacted gas was removed by purging to examine the weight change in the autoclave. It indicated formation of 195 g of a copolymer (E-g-EO).

To 180 g of E-g-EO in the autoclave were added 90 g of ε-caprolactone (CL) and 0.1 g of titanium tetraisopropoxide. The mixture was subjected to a reaction under atmospheric pressure at 170° C. for 2 hours to obtain 266 g of a wax-like graft copolymer (E-g-EO-CL).

The number-average molecular weight of each polymer used or obtained in the above procedure was measured using toluene as a solvent by a vapor pressure osmometer, using 117 Type Molecular Weight Tester manufactured by Corona K.K. The results are shown in Table 1.

TABLE 1

| Sample | Number-average molecular weight |
|---|---|
| EVA | 1,900 |
| EVOH | 1,610 |
| E-g-EO | 3,080 |
| E-g-EO—CL | 4,580 |

The gel permeation chromatograms of EVOH, E-g-EO and E-g-EO-CL are shown in FIG. 1.

As is clear from FIG. 1, the molecular weight distribution of E-g-EO is shifted to a higher-molecular weight side, as compared with that of EVOH, and the molecular weight distribution of E-g-EO-CL is shifted to an even higher-molecular weight side as compared to that of E-g-EO.

In Table 1, each graft copolymer shows an almost quantitative increase in number-average molecular weight. These facts indicate that ethylene oxide and ε-caprolactone were grafted to EVOH almost quantitatively.

Example 2

In a 1-liter autoclave were placed 1 g of potassium hydroxide and 100 g of a 90%-saponified product (EVOH) of an ethylene-vinyl acetate copolymer (EVA) having an ethylene content of 31% and a number-average molecular weight of 1,900. The mixture was heated to 170° C. Thereinto was introduced, in two hours, 200 g of ethylene oxide (EO) with the system being kept at 2 atm. to conduct a graft copolymerization, whereby 292 g of a copolymer (E-g-EO) formed.

100 g of the copolymer was taken in a 500-cc round-bottomed flask. Thereto were added 200 g of ε-caprolactone and 0.1 g of titanium tetraisopropoxide. The mixture was subjected to a reaction at 170° C. for 2 hours to obtain 296 g of a wax-like graft copolymer (E-g-EO-CL). The changes of the molecular weight distributions of E-g-EO and ε-caprolactone were traced by gel permeation chromatography (GPC). It indicated that as a result of the two-hour reaction, the peak of ε-caprolactone disappeared completely and the molecular weight distribution of E-g-EO shifted a higher-molecular weight side and became one large peak.

Example 3

In a 1-liter autoclave were placed 1 g of potassium hydroxide and 100 g of a 95%-saponified product (EVOH) of an ethylene-vinyl acetate copolymer (EVA) having an ethylene content of 28% and a number-average molecular weight of 2,000. The mixture was heated to 170° C. Thereinto was introduced, in two hours, 100 g of propylene oxide (PO) with the system being kept at 2 atm. to conduct a graft copolymerization. 196 g of a copolymer (E-g-PO) was formed.

To 180 g of E-g-PO in the autoclave were added 90 g of ε-caprolactone (CL) and 0.1 g of titanium tetraisopropoxide. The mixture was subjected to a reaction under atmospheric pressure at 170° C. for 2 hours to obtain 266 g of a wax-like graft copolymer (E-g-PO-CL).

The number-average molecular weight of each polymer used or obtained in the above procedure was measured by a vapor pressure osmometer. The results are shown in Table 2.

TABLE 2

| Sample | Number-average molecular weight |
|---|---|
| EVA | 2,000 |
| EVOH | 1,700 |
| E-g-PO | 3,250 |
| E-g-PO—CL | 4,890 |

The changes of the molecular weight distributions of E-g-PO and ε-caprolactone were traced by gel permeation chromatography (GPC). It indicated that after the reaction the peak of ε-caprolactone disappeared completely and the molecular weight distribution of E-g-PO shifted to a higher-molecular weight side and became one large peak.

Example 4

Using a hot roll, there were kneaded 50 g of E-g-EO-CL obtained in Example 1 (this was used as a plasticizer), 100 g of a polyvinyl chloride (SUMILIT SX-11F, a product of SUMITOMO CHEMICAL CO., LTD.), 3 g of tribasic lead sulfate and 1 g of dibasic lead phosphite (the last two compounds were used each as a stabilizer), followed by hot pressing. As a result, a tough transparent sheet was obtained.

What is claimed is:

1. A graft copolymer having a number-average molecular weight of about 1,500 to about 1,000,000, produced by graft-copolymerizing an alkylene oxide and a cyclic ester to a saponified ethylene-saturated carboxylic acid vinyl ester copolymer.

2. A graft copolymer according to claim 1, wherein the alkylene oxide and the cyclic ester are used in amounts of 5–1,000 parts by weight and 5–1,000 parts by weight, respectively, per 100 parts by weight of the saponified ethylene-saturated carboxylic acid vinyl ester polymer.

3. A graft copolymer according to claim 1, wherein the saponified ethylene-saturated carboxylic acid vinyl ester copolymer is a saponified ethylene-vinyl acetate copolymer.

4. A graft copolymer according to claim 1, wherein the saponified ethylene-saturated carboxylic acid vinyl ester copolymer is a saponified ethylene-vinyl acetate copolymer having an ethylene unit content of 1–90% by weight, a number-average molecular weight of 1,000–20,000 and a saponification degree of 30–100%.

5. A graft copolymer according to claim 1, wherein the alkylene oxide is ethylene oxide or propylene oxide.

6. A graft copolymer according to claim 1, wherein the cyclic ester is ε-caprolactone.

7. A plasticizer comprising, as the active component, a graft copolymer having a number-average molecular weight of about 1,500 to about 1,000,000, produced by graft-copolymerizing an alkylene oxide and a cyclic ester to a saponified ethylene-saturated carboxylic acid vinyl ester copolymer.

8. A plasticizer according to claim 7, wherein the active component is a graft copolymer produced by graft-copolymerizing 5–1,000 parts by weight of an alkylene oxide and 5–1,000 parts by weight of a cyclic ester to 100 parts by weight of a saponified ethylene-saturated carboxylic acid vinyl ester copolymer.

9. A plasticizer according to claim 7, wherein the saponified ethylene-saturated carboxylic acid vinyl ester copolymer is a saponified ethylene-vinyl acetate copolymer.

10. A plasticizer according to claim 7, wherein the saponified ethylene-saturated carboxylic acid vinyl ester copolymer is a saponified ethylene-vinyl acetate copolymer having an ethylene unit content of 1–90% by weight, a number-average molecular weight of 1,000–20,000 and a saponification degree of 30–100%.

11. A plasticizer according to claim 7, wherein the alkylene oxide is ethylene oxide or propylene oxide.

12. A plasticizer according to claim 7, wherein the cyclic ester is ε-caprolactone.

* * * * *